Nov. 24, 1953 B. HAGSTROM 2,659,995

FISH LURE

Filed Sept. 24, 1951

Bernard Hagstrom
INVENTOR.

BY *Clarence A. O'Brien*
*and Harvey B. Jacobson*
Attorneys

Patented Nov. 24, 1953

2,659,995

UNITED STATES PATENT OFFICE 2,659,995

FISH LURE

Bernard Hagstrom, Ashland, Wis.

Application September 24, 1951, Serial No. 247,949

1 Claim. (Cl. 43—42.06)

The present invention relates to certain new and useful improvements in fish lures and has more particular reference to one which lends itself to satisfactory and appropriate construction from easily formed lightweight sheet material and which is generally tubular in form.

As the preceding statement of the invention implies, tubulous and hollow lures are not new and it is therefore common practice to tow a tubular lure on a fishing line so that the water may tunnel itself through the lure, whereby to cause the latter to bob, weave and otherwise maneuver itself in indeterminate highly active and life-like manners. The obvious object of the invention is, therefore, to resort to the use of certain known fundamental structural principles in this line of endeavor and to structurally and functionally improve upon analogous prior art constructions and, in so doing, to provide a lure whose structural refinements and improvements will attract both manufacturers and fishermen.

Another object of the invention is to provide a lure which is aptly suitable for use in casting and trolling operations and which is allowed to roll and oscillate axially so that, along with such deceptive motions and accompanying darting movements, to some extent under the control of the fisherman, satisfactory results are virtually assured.

From a structural point of view a lure is provided which has a nominal portion of its length devoted to the production of a tube, circular in cross-section, which is commonly classified as the front portion, the median and trailing end portions being fashioned into what is appropriately comparable with a relatively deep scoop, the components functioning, additively considered, in achieving the desired end results, that is, a unique effectively functioning lure.

More specifically, the invention has to do with an open ended tubular front portion and a complemental rearward scoop portion with the leading end of the front portion cut obliquely and downwardly and the trailing end thereof cut obliquely on a more gradual angle and merging into the scoop portion, providing a lure which glides through the water, may oscillate, but will not turn completely over and over and will ride over obstructions and weeds with satisfaction to the user.

Other objects and advantages will become more readily apparent from the following description and the accompanying sheet of illustrative drawings.

In the accompanying sheet of drawings whereon like numerals are employed to designate like parts throughout the views.

Figure 1:
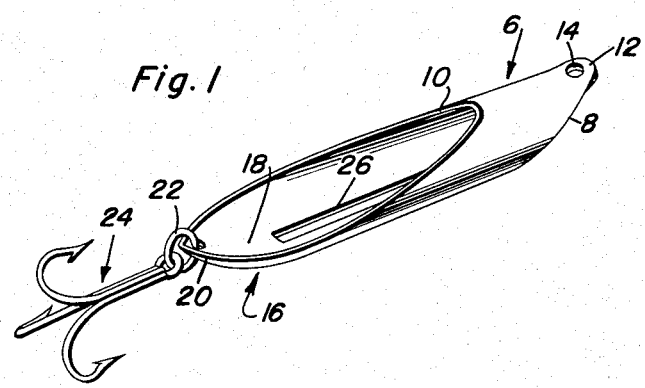
Figure 1 is a perspective view of a lure constructed in accordance with the invention.
Figure 2:
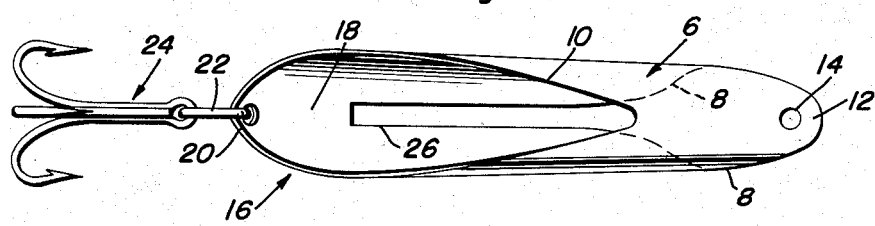
Figure 2 is a top plan view of the same on a slightly enlarged scale.
Figure 3:
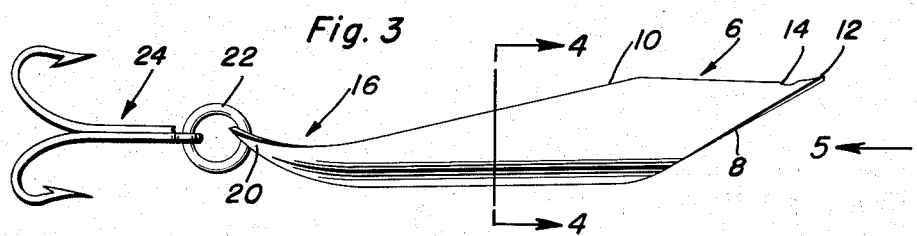
Figure 3 is a side elevation of the showing made in Figure 2.
Figure 4:
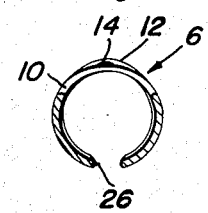
Figure 4 is a cross-section on the line 4—4 of Figure 3, looking in the direction of the arrows.
Figure 5:
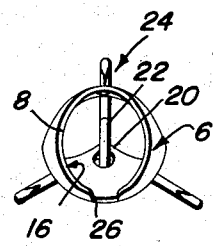
Figure 5 is a front end elevation, a view observing the structure of Figure 3 in the direction of the arrow 5 in Figure 3.

The lure is fashioned or formed from commercial plastics, metal or other sheet material whose surfaces may be finished in any desired manner to give either a dazzling finish or a dull finish according to the intentions of the manufacturer. The tubular front portion, denoted by the numeral 6 is, as before indicated, open ended and substantially cylindrical in cross-sectional form. The forward or leading end, as shown best in side elevation in Figure 3, is obliquely cut from dorsal to ventral portions in a rearward and downward direction, as at 8. The opposite trailing end of said front portion is likewise obliquely cut from the dorsal to ventral portions and also rearwardly and downwardly, as at 10, but on a more gradually sloping angle. The frontal top portion is rounded off to give the desired nose effect and it is directed laterally and upwardly as at 12 and provided with an aperture 14 to accommodate the fishing line (not shown). The oblique sloping rear open end of the tubular head portion merges into and integrates with the body and rearward or trailing end portion which may be conveniently designated as a scoop 16. This is generally channel-shaped in cross-section and is concavo-convex in form and is rather deeply dished with its concave side facing upwardly as at 18 and its convex side defining the main ventral portion. The extreme terminal end is formed into a sort of a curvate beak 20 which is apertured and has a ring 22 attached thereto, said ring carrying a fishhook 24. The belly or ventral portion is provided with an elongated slot 26 which is closed and terminates forwardly of the trailing end and opens through the leading end.

Briefly summarized, the lure which is the subject matter of this application for patent is characterized as clearly shown in the drawing by a thin walled tube which may be said to be made up of a tubular open ended front portion, a medial portion, and a rear portion combining to provide the aforementioned scoop. The front end of the upper wall is curved as denoted at 12 and provided with an opening for attachment of fishing line (not shown). The rear end of the tube, that is the central or lower wall thereof is curved upwardly and provided, as shown, with an opening to permit the fishhook means 24 to be attached appropriately. This lower wall, that is the wall 18, is provided as stated with the slot 26 which, it will be noted, starts at the bottom of the wall 18 and extends therefrom through the full length of the bottom or ventral wall, the tube being entirely open on its upper side from the rear end thereto to a point in advance of the median thereof. The edges of the opening are uninterruptedly downwardly inclined from the front end to substantially the central part of the upwardly curved lower wall and the front end of the tube is arcuate in cross-section and has its bottom edges inclined downwardly and rearwardly and merging with the longitudinal edges of the stated slot.

It is a matter of common knowledge that many and varied assertions are made in respect to varying achievements and accomplishments in all sorts of motions and actions of lures. The instant application shall not, however, be devoted to the alleged darting, diving and other effects which are susceptible of attainment depending largely on the handling of the fishing line, the conditions of the water and so on. The instant invention has to do with the given shapes and coacting components shown which provide a streamlined lure whose head portion is tubular and whose respective end portions are of relatively varying obliquities with the sloping longer oblique rear end merging into a scoop-shaped spoon.

Minor changes in shape, size, materials and rearrangement of parts may be resorted to in actual practice provided no departure is made from the invention as claimed.

Having described the invention, what is claimed as new is:

A fishing lure comprising a thin-walled tube of substantially circular cross-section, said tube having the front end of the upper wall thereof curved upwardly and provided with an opening for the attachment of a fishing line thereto, said tube having the rear end of the lower wall thereof curved upwardly and provided with an opening for the attachment of a fishhook thereto, said lower wall having a longitudinal slot therein starting substantially at the bottom of the upward curved portion and extending forwardly thereof the full length of the bottom wall, said tube being entirely open on its upper side from the rear end thereof to a point in advance of the median thereof, the edges of said opening being uninterruptedly downwardly inclined from the front end thereof to substantially the central part of the curved lower wall, and the front end of the tube being arcuate in cross-section and having the bottom edges thereof inclined downwardly and rearwardly and extending inwardly to merge with the longitudinal edges of the longitudinal slot.

BERNARD HAGSTROM.

References Cited in the file of this patent

UNITED STATES PATENTS

| Number | Name | Date |
|---|---|---|
| 1,078,886 | Welles | Nov. 18, 1913 |
| 1,611,644 | Johnson | Dec. 21, 1926 |
| 1,710,908 | Vereecken | Apr. 30, 1929 |
| 2,108,728 | Schilling | Feb. 15, 1938 |
| 2,476,388 | Schafer | July 19, 1949 |
| 2,569,465 | Farr | Oct. 2, 1951 |